United States Patent Office 3,043,883
Patented July 10, 1962

3,043,883
MANUFACTURE OF RESORCINOL
Bernard Hammond Markham Thompson, Lower Kingswood, England, assignor, by mesne assignments, to Hercules Powder Company, a corporation of Delaware
No Drawing. Filed Aug. 5, 1959, Ser. No. 831,734
Claims priority, application Great Britain Aug. 8, 1958
3 Claims. (Cl. 260—621)

The present invention relates to the manufacture of dihydric phenols and in particular to the recovery and isolation of resorcinol prepared by the cleavage of meta-diisopropylbenzene dihydroperoxide.

Resorcinol may be prepared by the oxidation of meta-diisopropylbenzene to give an oxidate containing meta-diisopropylbenzene dihydroperoxide from which the dihydroperoxide may be separated, for instance by extraction with alkali and subsequently catalytically cleaved to give a reaction product containing resorcinol. Alternatively, the oxidate may be subjected to catalytic cleavage of the hydroperoxide contained in it without separation. Such cleavage products contain material less volatile than resorcinol, which probably comprises a high boiling condensation product of resorcinol with meta-isopropenyl phenol, and this material may be thermally decomposed in the presence of steam while simultaneously distilling off the additional quantities of resorcinol and meta-isopropenyl phenol so formed, and the resorcinol and meta-isopropenyl phenol may be recovered from the aqueous distillate. During recovery the meta-isopropenyl phenol shows a marked tendency to recombine with the resorcinol, thereby decreasing the yield of resorcinol. Furthermore, this tendency makes it difficult or impossible to recover pure resorcinol by fractional distillation of the aqueous distillate, owing to the formation and decomposition of the condensation product in the still during the distillation, and as a result it is usually necessary to separate the meta-isopropenyl phenol from the resorcinol by extraction.

According to the present invention the process for the manufacture of resorcinol by the catalytic cleavage of a reaction mixture containing meta-diisopropylbenzene dihydroperoxide derived from the oxidation of meta-diisopropylbenzene, comprises decomposing by the action of heat the material contained in the cleavage reaction product which is less volatile than resorcinol while passing steam through said material, simultaneously distilling off the additional quantities of resorcinol and the meta-isopropenyl phenol so formed, separating any oil phase from the aqueous distillate and subjecting the latter to flash distillation to obtain an overhead fraction containing water and meta-isopropenyl phenol and a substantially anhydrous residue fraction containing resorcinol substantially free from meta-isopropenyl phenol.

The surprising discovery on which the process of the present invention is based is that, although a pure resorcinol fraction cannot be obtained by a normal distillation of the aqueous distillate obtained from the thermal decomposition step, by subjecting the aqueous distillate to flash distillation it is possible to obtain an overhead fraction containing water and meta-isopropenyl phenol together with small amounts of resorcinol, and an anhydrous residue fraction containing the major portion of the resorcinol substantially free from meta-isopropenyl phenol.

The reaction product resulting from the catalytic cleavage of a reaction mixture containing meta-diisopropylbenzene dihydroperoxide contains, in addition to resorcinol and material less volatile than resorcinol, acetone, the cleavage catalyst and possibly unchanged hydrocarbon. This product, before being processed according to the present invention, is preferably first treated to remove or neutralise the catalyst and stripped of low boiling materials such as acetone and unchanged hydrocarbons. Then the heat-treatment may be carried out after removal, for instance by distillation, of some of the free resorcinol, or the heat-treatment may be carried out concurrently with the distillation of the cleavage reaction product without prior removal of any of the free resorcinol.

The decomposition by the action of heat of the material contained in the cleavage reaction product which is less volatile than resorcinol while passing steam through said material may be carried out over a moderately wide temperature range, for instance at temperatures in the liquid mixture between 170° and 400° C. No advantage is gained by operating at temperatures above 300° C., and a preferred temperature range is between about 200° and 270° C. Lower or higher temperatures may be used if desired, but at temperatures below 200° C. the decomposition of the material less volatile than resorcinol takes place slowly and may not proceed to completion, while at temperatures in the region of 400° C. and above coke deposition is likely to occur.

In the process of the present invention, it is preferred to use superheated steam, the steam being passed through the material being treated in such a volume that the resulting vapour phase when condensed forms a 20 to 40% aqueous solution of resorcinol. The steam is desirably introduced at a temperature of the order used for the thermal decomposition. Thus, it may be introduced at a temperature in the order of 170 to 300° C., or alternatively at 100° C., in which case it will be instantaneously superheated by the vessel contents.

The thermal decomposition may be carried out at any convenient pressure, and atmospheric pressure or slightly less than atmospheric pressure is preferred. The operation may be conveniently carried out in the kettle of the still used for fractionating the product of the cleavage reaction. For instance, after low boiling materials have been removed, the pressure may be reduced and a fraction containing resorcinol collected. Then, when part of the free resorcinol has been removed, steam is passed in and the kettle temperature is allowed to rise until cracking of the material less volatile than resorcinol takes place, whereby meta-isopropenyl phenol and additional quantities of resorcinol are produced and at once are carried off by the steam. Alternatively, the steam may be passed in throughout the whole operation. If the whole distillation is carried out at increased pressures, the thermal decomposition may precede the collection of any resorcinol, and a fraction comprising meta-isopropenyl phenol and resorcinol collected.

The distillate, which is preferably maintained at a pH of at least 4 according to the process described in copending application Serial No. 831,733, filed August 5, 1959, comprises two phases, of which the upper oil phase containing meta-isopropenyl phenol, but substantially no resorcinol is separated from the aqueous phase, preferably by decantation.

The flash distillation of the aqueous phase of the distillate to obtain an overhead fraction containing water and meta-isopropenyl phenol and a residue fraction containing resorcinol substantially free from meta-isopropenyl phenol may be carried out in any suitable manner. Suitable pressures and temperatures at which the flash distillation may be carried out range from about 50 mm. at wall temperatures of about 170° C., up to atmospheric pressure at wall temperatures of about 250° C. Preferably, the flash distillation is carried out in a climbing film evaporator under a reduced pressure of about 200 mm., and at a wall temperature of about 210° C. Pure resorcinol substantially free from meta-isopropenyl phenol may be obtained by distillation of the residue fraction from the flash distillation step.

The overhead fraction obtained in the flash distillation step, which contains water, meta-isopropenyl phenol and small amounts of resorcinol may be treated if desired in any suitable manner for the recovery of the resorcinol and of the meta-isopropenyl phenol.

The following comparative examples are given further to illustrate the process of the present invention.

*Example 1*

Crude aqueous resorcinol obtained from the acid catalysed cleavage of meta-diisopropylbenzene dihydroperoxide by neutralisation and distillation of acetone contained approximately 41% resorcinol, 29% by-products and 30% water. This crude aqueous resorcinol solution (pH 2.0) was brought to pH 3.7 by the addition of a little aqueous ammonia and then subjected to a heat-treatment and stripped with superheated steam. The hot vapours obtained from this process were led to an intermediate feed point in an efficient continuous steam distillation column. By-products were taken overhead with the steam and the resorcinol collected in the kettle from which it was continuously withdrawn at the desired concentration (ca. 60% w./w.).

After separating the oily by-product phase from the steam distillate it was found that 60% of the by-products normally contained in the product from the heat-treatment stage had been separated from the resorcinol.

In this experiment 12 parts by weight of steam per part of resorcinol were used and 43 parts by weight of steam were required to separate 1 part of by-product.

The aqueous resorcinol (pH 4.5) obtained from the kettle of the steam distillation column was dehydrated and distilled. Only 82% of the resorcinol initially present in the feed to the heat-treatment was recovered at a purity of 91%.

*Example 2*

Another experiment was performed using the same feed to the heat-treatment as in Example 1. The hot vapours from the heat-treatment and stream stripping stage were quenched in a water-jacketed condenser and the condensate allowed to layer in a decanter. The lower aqueous resorcinol phase (60% resorcinol, pH 4.0) was dehydrated in a climbing film evaporator operated at 210° C. and 200 mm. pressure. The aqueous distillate from the evaporator contained an oily upper phase amounting to 10% w./w. of the distillate. The aqueous distillate was found to contain 1.5% w./w. resorcinol.

Much greater by-product separation per unit of steam (1:9) was achieved in the evaporator than in the stream distillation of Example 1 (1:43). Only 0.67 part by weight of steam was used per part of resorcinol.

The overall by-product separation achieved by the combined stages of decantation and film evaporation amounted to 96% of that normally contained in the product from the heat treatment.

The resorcinol obtained from the film evaporator was flash distilled. The distilled resorcinol amounted to 96% of that present in the feed to the heat treatment, and was 98% w./w. pure.

I claim:

1. In the process for the production of resorcinol wherein (1) a reaction mixture derived from the oxidation of meta-diisopropylbenzene and containing meta-diisopropyylbenzene dihydroperoxide is subjected to acid cleavage to produce resorcinol and material less volatile than resorcinol, (2) the material less volatile than resorcinol is heat decomposed while passing superheated steam through the material, (3) the additional quantities of resorcinol and meta-isopropenyl phenol so formed are simultaneously distilled off to provide a distillate composed of an upper oil phase containing meta-isopropenyl phenol and some resorcinol and a lower aqueous phase containing water, resorcinol and some meta-isopropenyl phenol, and (4) the resorcinol is recovered from the distillate, the improvement of separating the oil phase from the aqueous phase of the distillate by decantation, introducing the aqueous phase into an evaporator and providing a climbing film of said aqueous phase on the wall of the evaporator, subjecting said film to dehydration at a pressure in the range from about 50 millimeters at an evaporator wall temperature of about 170° C. up to atmospheric pressure at an evaporator wall temperature of about 250° C., collecting from the evaporator an overhead fraction containing water and meta-isopropenyl phenol and recovering from the evaporator an anhydrous residue fraction containing resorcinol substantially free from meta-isopropenyl phenol.

2. The process of claim 1 wherein the pressure is about 200 millimeters at an evaporator wall temperature of about 210° C.

3. The process of claim 1 wherein the anhydrous residue fraction containing resorcinol is distilled to recover pure resorcinol.

References Cited in the file of this patent

UNITED STATES PATENTS

| | | |
|---|---|---|
| 2,447,746 | Ferris et al. | Aug. 24, 1948 |
| 2,471,893 | Pulley | May 31, 1949 |
| 2,722,506 | Ellis | Nov. 1, 1955 |
| 2,744,939 | Kennel | May 8, 1956 |

FOREIGN PATENTS

| | | |
|---|---|---|
| 775,813 | Great Britain | May 29, 1957 |